United States Patent
Luo et al.

(10) Patent No.: US 10,356,011 B2
(45) Date of Patent: Jul. 16, 2019

(54) PARTIAL SOFTWARE DEFINED NETWORK SWITCH REPLACEMENT IN IP NETWORKS

(71) Applicant: Futurewei Technologies, Inc., Plano, TX (US)

(72) Inventors: Min Luo, San Jose, CA (US); Cing-yu Chu, Long Island City, NY (US); Kang Xi, Morganville, NJ (US); Hung-Hsiang Jonathan Chao, Holmdel, NJ (US); Wu Chou, Basking Ridge, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 139 days.

(21) Appl. No.: 14/990,026

(22) Filed: Jan. 7, 2016

(65) Prior Publication Data
US 2016/0119255 A1 Apr. 28, 2016

Related U.S. Application Data

(63) Continuation-in-part of application No. 14/710,439, filed on May 12, 2015, now abandoned.
(Continued)

(51) Int. Cl.
*H04L 12/28* (2006.01)
*H04L 12/939* (2013.01)
(Continued)

(52) U.S. Cl.
CPC ........ *H04L 49/557* (2013.01); *H04L 12/4633* (2013.01); *H04L 12/6418* (2013.01);
(Continued)

(58) Field of Classification Search
CPC ... H04L 49/557; H04L 41/12; H04L 41/0663; H04L 41/0816; H04L 45/02; H04L 49/70;
(Continued)

(56) References Cited

U.S. PATENT DOCUMENTS

| 8,964,752 B2 * | 2/2015 | Zhang | H04L 45/38 370/392 |
| 9,246,847 B2 * | 1/2016 | Mishra | H04L 69/04 |

(Continued)

FOREIGN PATENT DOCUMENTS

| CN | 100466623 C | 3/2009 |
| JP | 2009060673 A | 3/2009 |
| RU | 2322772 C2 | 4/2008 |

OTHER PUBLICATIONS

Foreign Communication From a Counterpart Application, PCT Application No. PCT/US2015/30426, International Search Report dated Aug. 20, 2015, 3 pages.
(Continued)

*Primary Examiner* — Phuc H Tran
(74) *Attorney, Agent, or Firm* — Conley Rose, P.C.

(57) ABSTRACT

The claimed subject matter is directed to novel methods and systems for a network topology wherein an Internet Protocol (IP) network is partially integrated and enhanced with a relatively small number of Software Defined Network (SDN)-Openflow (SDN-OF) enabled network devices to provide a resilient network that is able to quickly recover from a network failure and achieves post-recovery load balancing while minimizing cost and complexity. The SDN-OF Controller, or a management node, determines such a minimum set of SDN-OF enabled devices and establishes IP tunnels to route traffic from nodes affected by failure to designated SDN-OF switches and finally to the final destination without looping back to the failed link or node. By combining SDN-OF enabled switches with IP nodes such as routers, a novel network architecture and methods are described herein that allows for ultra-fast and load balancing-aware failure recovery of the data network.

18 Claims, 6 Drawing Sheets

Related U.S. Application Data

(60) Provisional application No. 61/992,063, filed on May 12, 2014.

(51) Int. Cl.
| | | |
|---|---|---|
| *H04L 12/707* | (2013.01) | |
| *H04L 12/64* | (2006.01) | |
| *H04L 12/947* | (2013.01) | |
| *H04L 12/46* | (2006.01) | |
| *H04L 12/931* | (2013.01) | |
| *H04L 12/751* | (2013.01) | |
| *H04L 12/24* | (2006.01) | |
| *H04L 12/703* | (2013.01) | |
| *H04L 12/911* | (2013.01) | |

(52) U.S. Cl.
CPC ...... *H04L 41/0663* (2013.01); *H04L 41/0816* (2013.01); *H04L 41/12* (2013.01); *H04L 45/02* (2013.01); *H04L 45/22* (2013.01); *H04L 49/25* (2013.01); *H04L 49/70* (2013.01); *H04L 41/0893* (2013.01); *H04L 41/5096* (2013.01); *H04L 45/28* (2013.01); *H04L 47/825* (2013.01)

(58) Field of Classification Search
CPC . H04L 12/4633; H04L 12/6418; H04L 49/25; H04L 45/22; H04L 41/5096; H04L 41/0893; H04L 45/28; H04L 47/825
See application file for complete search history.

(56) References Cited

U.S. PATENT DOCUMENTS

| | | | | |
|---|---|---|---|---|
| 9,338,097 | B2* | 5/2016 | Anand | H04L 47/125 |
| 2004/0203787 | A1 | 10/2004 | Naghian | |
| 2013/0148660 | A1 | 6/2013 | Ashwood-Smith et al. | |
| 2013/0266007 | A1 | 10/2013 | Kumbhare et al. | |
| 2013/0329548 | A1* | 12/2013 | Nakil | H04L 41/0668 370/228 |
| 2013/0329734 | A1 | 12/2013 | Chesla et al. | |
| 2014/0169158 | A1* | 6/2014 | Mishra | H04L 69/04 370/228 |
| 2014/0229945 | A1* | 8/2014 | Barkai | H04L 49/70 718/1 |

OTHER PUBLICATIONS

Foreign Communication From a Counterpart Application, PCT Application No. PCT/US2015/30426, Written Opinion dated Aug. 20, 2015, 10 pages.
Ashwood-Smith, P., et al., "SDN State Reduction," XP15094727, draft-ashwood-sdnrg-state-reduction-00.txt, Jul. 3, 2013, 23 pages.
Kozat, U., et al., "On Diagnosis of Forwarding Plane Via Static Forwarding Rules in Software Defined Networks," XP32613389, IEEE Conference on Computer Communications, Apr. 27, 2014, 10 pages.
"OpenFlow Switch Specification," XP55322518, Open Networking Foundation, Version 1.4.0 (Wire Protocol 0x05), ONF TS-012, Oct. 14, 2013, 206 pages.
Foreign Communication From a Counterpart Application, European Application No. 15792259.2, Extended European Search Report dated Feb. 8, 2017, 13 pages.
Office Action dated Jan. 5, 2017, 26 pages, U.S. Appl. No. 14/710,439, filed May 12, 2015.
Machine Translation and Abstract of Japanese Publication No. JP2009060673, Mar. 19, 2009, 17 pages.
Foreign Communication From a Counterpart Application, Japanese Application No. 2016-557221, Japanese Office Action dated Oct. 31, 2017, 7 pages.
Foreign Communication From a Counterpart Application, Japanese Application No. 2016-557221, English Translation of Japanese Office Action dated Oct. 31, 2017, 8 pages.
Foreign Communication From a Counterpart Application, Russian Application No. 2016138570, Russian Search Report dated Dec. 19, 2017, 2 pages.
Foreign Communication From a Counterpart Application, Russian Application No. 2016138570, English Translation of Russian Search Report dated Dec. 19, 2017, 2 pages.
Foreign Communication From a Counterpart Application, Russian Application No. 2016138570, English Translation of Russian Office Action dated Dec. 19, 2017, 5 pages.
Machine Translation and Abstract of Chinese Publication No. CN100466623, Mar. 4, 2009, 11 pages.
Foreign Communication From a Counterpart Application, Chinese Application No. 201580011787.4, Chinese Office Action dated Jan. 3, 2019, 8 pages.
Foreign Communication From a Counterpart Application, Chinese Application No. 201580011787.4, Chinese Search Report dated Dec. 25, 2018, 3 pages.

* cited by examiner

Exemplary Network
Topology 100

Exemplary Computer System
600

PARTIAL SOFTWARE DEFINED NETWORK SWITCH REPLACEMENT IN IP NETWORKS

CLAIM OF PRIORITY

This application is a continuation-in-part of U.S. Non-Provisional application Ser. No. 14/710,439, filed May 12, 2015, which claims the benefit of U.S. Provisional Application No. 61/992,063, filed May 12, 2014, both of which are incorporated by reference herein in their entirety and for all purposes.

TECHNICAL FIELD

The claimed subject matter pertains to hybrid networks. In particular, it provides mechanisms for partial integration of Software Defined Networking (SDN) devices in Internet Protocol (IP) infrastructures in order to achieve potential benefits of SDN to facilitate fast failure recovery and post-recovery load balancing in the dominant IP networks.

BACKGROUND

The continued evolution and integration of computer networking has led to computerized networks becoming the backbone of modern communication. Yet, despite the tremendous development, both small and large scale computer networks remain subject to service interruptions and failures (due to, for example, inadvertent cable damage, interface card faults, software bugs, and mis-configuration, etc.). Computer networks typically utilize a networking model and communications protocols defined by the Internet Protocol Suite such as Transmission Control Protocol (TCP)/IP.

These networks, also known as Internet Protocol (IP) networks, typically adhere to a topology that includes multiple nodes, such as data communication equipment ("DCE") like switches and routers; or data terminal equipment ("DTE") such as computers, servers, mobile devices. In typical networks, both DCEs and DTEs may be addressed individually in the network and interconnected by communication links. Data is transmitted throughout the network by being routed through one or more links until it reaches the node at the destination address. Network failures result when a networked node or link is unresponsive or otherwise incapable of either processing and/or forwarding data on to the next node along the route.

IP networks utilize a variety of methods to assist in recovery from network failures. Unfortunately, some recovery methods (such as shortest-path recalculation, IP fast reroute, etc.) are typically unable to provide sufficient coverage to all possibly affected nodes or links in the network. More sophisticated methods may be able to provide sufficient coverage, but in exchange can be inconveniently disruptive and prohibitively complex. Additionally, convergence to stand-by resources may be problematic or time-consuming, and worse still these types of solutions may be able to reach only locally optimal solutions that could easily lead to new congestions in the network, while also preventing some of the resources from being utilized due to their distributed nature.

Software Defined Networking (SDN) is an approach to data/computer networking that decouples the primary functions of a computer network infrastructure. Under SDN solutions, the mechanism for making network traffic routing and management decisions (the control plane) is decoupled from the systems that perform the actual forwarding of the traffic to its intended destinations (the data plane). Decoupling the control plane from the data plane allows for the centralization of control logic with a global view of the network status and traffic statistics that eventually lead to much improved resource utilization, effective policy administration and flexible management with significantly reduced cost.

Under many SDN implementations, network devices still perform the functions on the data plane, but the functions performed on the control plane are decoupled and abstracted to a logically central layer/plane. OpenFlow (OF) is a standardized protocol used by an external network controller (typically a server) to communicate with a network device (typically a network switch) in SDN networks. The OF protocol allows the controller to define how packets are forwarded at each SDN network device, and the networking devices (such as switches) to report to the controller their status and/or traffic statistics.

While becoming increasingly popular, the deployment of SDN devices (e.g., SDN switches) is generally a gradual process, due to the cost and labor required to replace incumbent Internet Protocol (IP) network devices with SDN enabled network devices. Moreover, large-scale replacement of existing portions of infrastructure would likely result in severe service disruptions if performed all at once.

SUMMARY

As a solution to the type of problems noted above, this disclosure provides novel methods and systems for a network topology wherein an IP network is partially integrated and augmented with SDN-OF (or other controller-switch communication) enabled network devices to provide a resilient network that is able to quickly recover from network failures at single links or nodes, and achieves post-recovery load balancing while minimizing cost and complexity. By replacing a very limited number of IP nodes (such as routers) with SDN-OF enabled switches, this disclosure discloses a novel network architecture and methods that allow for ultra-fast and load balancing-aware failure recovery of the data network.

According to an aspect of the disclosure, a device is provided that manages SDN-OF devices (such as SDN-OF enabled switches) integrated in an IP network. In one embodiment, a network device is described comprising a memory and a processor. The memory stores a plurality of programmed instructions operable, when executed, to instantiate a network controller of a hybrid network comprising a plurality of networking entities, the networking entities comprising a plurality of network nodes communicatively coupled by a plurality of links. The processor is configured to execute the plurality of programmed instructions stored in the memory to compute traffic routing configurations for the hybrid network, to distribute traffic routing configurations to the plurality of network nodes, to determine a current network state of the hybrid network; and to determine current traffic loads in the hybrid network.

According to one or more embodiments of the disclosure, the plurality of network nodes may comprise a combination of a plurality of Internet Protocol (IP) networking devices and a plurality of Software-Defined Networking (SDN) enabled networking devices. Data packets intended to be sent to a destination network node from a first network node (the detecting node)—through a failed networking entity of the plurality of networking entities—are forwarded by the first network node to a designated network node of the plurality of network nodes based on the traffic routing configurations that can be either pre-configured or dynamically recomputed by the controller. According to still further embodiments, the designated network node may be further configured to reroute the data packets to the destination network node along a plurality of routes that bypasses the failed network entity while load balancing traffic in the hybrid network based on the traffic routing configurations.

According to another aspect of the disclosure, a method executed by the controller for performing packet routing in a hybrid network is provided. In one or more embodiments, the method may be performed by determining, in a first network node, a subset of network nodes of a hybrid network, the hybrid network comprising a plurality of network nodes communicatively coupled by a plurality of links; computing traffic routing configurations in the first network node; and distributing the traffic routing configurations to the subset of network nodes, wherein the subset of network nodes are enabled with SDN-OF functionality.

According to yet another aspect of the disclosure, a method is provided for re-routing data due to link failure in a hybrid network. In one or more embodiments, the steps performed in this method may include receiving, in a designated SDN-OF enabled networking device, a plurality of data packets intended to be routed through a failed networking entity wherein the plurality of data packets is received from a first networking device corresponding to the failed network entity via an established IP tunnel between the designated SDN-OF enabled networking device and the first networking device; receiving a traffic routing configuration from an SDN controller; referencing the traffic routing configuration in the designated SDN-OF enabled networking device to determine an intermediate networking device between the designated SDN-OF enabled networking device and an intended destination node; and forwarding the plurality of data packets from the designated SDN-OF enabled networking device to the intended destination node if the designated SDN-OF enabled networking device is directly coupled toward the intended destination node via the intermediate networking device.

According to yet another aspect of the disclosure, a SDN-OF controller (or a management node) is provided. In one or more embodiments, the controller includes a database comprising network topology (both the initial IP network and the post SDN-OF enabled network), state, and traffic flow statistics. In one or more embodiments, the controller further comprises a processor coupled to the database and configured to process the IP network topology to determine a minimum subset of IP nodes to be upgraded to SDN nodes to create a hybrid IP/SDN network that provides network wide SDN path failure protection. According to still further embodiments, the controller may also comprise a transmitter coupled to the processor and configured to transmit a SDN-OF capable software module to at least one IP node in the minimum subset of IP nodes to upgrade the at least one IP node to an SDN-OF node.

According to yet another aspect of the disclosure, a method is provided. In one or more embodiments, the method is performed by determining, by a processor in an SDN controller, a designated SDN node for each un-upgraded IP node in a hybrid IP/SDN network, wherein the designated SDN node is reachable by the un-upgraded IP node via IP tunnel upon a link failure, and transmitting, by a transmitter in the SDN controller, control data to each un-upgraded IP node indicating the corresponding designated SDN node.

According to yet another aspect of the disclosure, after the IP network is transformed into a hybrid IP and SDN-OF network, the controller may dynamically re-compute the selection, placement and then enable SDN-OF functionalities for those chosen devices, in case more network nodes, such as the SDN-OF enabled devices, become dysfunctional, or network traffic surges in some areas.

According to one or more implementations, the plurality of data packets may be automatically forwarded from a first networking device corresponding to the failed network entity via an established IP tunnel between the designated SDN-OF enabled networking device and the first networking device. In still further implementations, the failed networking entity may comprise a failed link, a failed network node, or both. According to one or more embodiments, the traffic routing configuration may be computed by a network controller and distributed to the designated SDN-OF enabled networking device.

BRIEF DESCRIPTION OF DRAWINGS

The accompanying drawings, which are incorporated in and form a part of this specification, illustrate embodiments of the disclosure and, together with the description, serve to explain the principles of the presently claimed subject matter:

DETAILED DESCRIPTION

Figure 1:
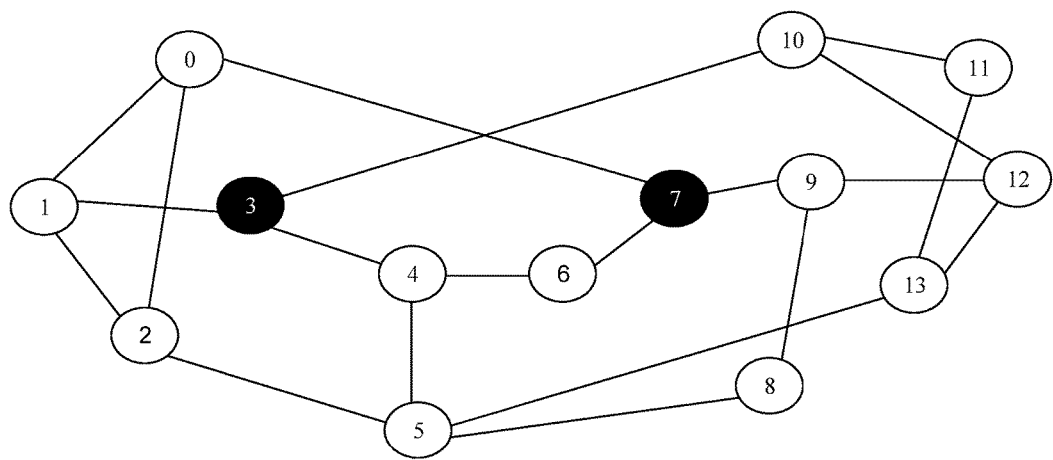
FIG. 1 depicts an illustration of an exemplary network topology, in accordance with various embodiments of the present disclosure.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Portions of the detailed description that follow are presented and discussed in terms of a process. Although operations and sequencing thereof are disclosed in a figure herein (e.g., FIGS. 4 and 5) describing the operations of this process, such operations and sequencing are exemplary. Embodiments are well suited to performing various other operations or variations of the operations recited in the flowchart of the figure herein, and in a sequence other than that depicted and described herein.

As used in this application the terms component, module, system, and the like are intended to refer to a computer-related entity, specifically, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application and/or module running on a computing device and the computing device can be a component. One or more components can reside within a process and/or thread of execution, and a component can be localized on one computer and/or distributed between two or more computers. In addition, these components can be executed from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Various techniques described herein can be used for various data communication systems and protocols, including Software Defined Networking (SDN), OpenFlow (OF), and Internet Protocol (IP), etc. The terms "system" and "network" may be used herein interchangeably. A network entity may include a network node (e.g., an IP router or switch) or a link between two nodes. The terms "node" and "network node" may also be used herein interchangeably. An SDN-OF enabled device may include (but is not limited to) a dedicated network device such as an SDN-OF switch, an SDN-OF router, or an SDN-OF router/switch combination, or may include IP network devices (such as routers) that have been programmed with modules with SDN-OF functionality (such as an SDN-OF enablement application module).

As described herein, various solutions are provided that integrate SDN-OF devices (such as SDN-OF enabled switches) into an IP network. In one embodiment, a solution may be adapted from an existing IP network, rather than a brand new network built from scratch. According to alternate embodiments, the solution may be a new hybrid IP and SDN network, and may even be extended to a multi-protocol label switching (MPLS) (or other technology and protocols) networks through the integration of SDN-OF switches and a network controller. Furthermore, various aspects are described herein in connection with a computer or data network implemented as an arrangement of nodes connected by links. According to one or more embodiments, a relatively small number of existing IP routers/switches in an IP network are replaced, based on a selection and placement algorithm executed by an SDN-OF controller, with pure or hybrid SDN-OF enabled switches to form a hybrid partial-SDN network. In one or more alternate embodiments, the hybrid SDN network can select a few (programmable) IP routers in which SDN applications and modules may be executed or replace them with pure SDN-OF switches. Such hybrid networks are able to quickly recover from a failure and to achieve post-recovery load balancing with more reasonable and acceptable, and significantly reduced complexity utilizing SDN-OF technologies.

According to an aspect of the disclosure, a method is provided and executed by the SDN controller to minimize the number of SDN network devices required for enabling such capabilities in a given IP network, while guaranteeing failure recovery reachability and a method to optimize the placement of such SDN switches. In an embodiment, minimizing the number of SDN enabled network devices may be performed by selecting a subset of an existing pool of IP network nodes (e.g., routers) to be replaced by SDN-OF enabled devices (e.g., switches). Alternately, a subset of the existing IP network nodes may, if suitable, be programmed with SDN-OF modules. In addition, the placement of the chosen number of SDN-OF enabled devices should ensure that each recovery path does not traverse the failure (link or node), when an error occurs.

According to an aspect of the disclosure, a method is provided and executed in part by a controller to quickly recover from failures and resume data forwarding. In one or more embodiments, the process by which recovery from failures is performed also incorporates load balancing during recovery. In one or more embodiments, failure recovery is possible by detecting a failure in a network entity, such as a network node or link, and forwarding the data packets to an SDN-OF enabled device via IP tunneling. The SDN-OF enabled device then references a flow table provided by the external SDN-OF controller or pre-configured based on offline routing with given or predicted traffic matrices, before forwarding the data packets onto an intermediate node in an alternate route guaranteed to reach the final destination and bypass the failed network entity (e.g., a node or link). When a node detects a failure, it immediately reroutes the affected packets to such a pre-configured SDN-OF enabled networking device (such as a switch). The SDN switch then intelligently sends the flows to their respective intermediate nodes that guarantee the reachability to the intended destination without looping back by utilizing the multiple paths based on the above computed flow entries in the flow tables. The SDN enabled networking devices can also dynamically adjust flow rerouting to achieve load balancing, based on the current network state and/or the current load in the network nodes.

SDN-OF/IP Hybrid Networks

FIG. 1 depicts a block diagram of an exemplary network topology 100 according to various embodiments. Network topology 100 comprises an IP network configured to communicate network traffic. Network topology 100 comprises nodes 0-13 coupled via links as shown in FIG. 1. The IP network of network topology 100 may be a core network. For example, nodes 0-13 may be IP and/or media access control (MAC) based router and/or switch nodes. Nodes 0-13 may be positioned in geographically distant data centers and/or other high capacity communication facilities. For example, node 0 may be positioned in Oregon, node 1 may be positioned in California, node 5 may be positioned in Texas, node 11 may be positioned in New York, etc. As such, nodes 0-13 may couple network traffic across the United States. While fourteen nodes are shown, any number of nodes may be employed to interconnect any geographic region of interest, such as Europe, Asia, etc. End users may connect to nodes 0-13 via access networks (not shown). The links coupling nodes 0-13 are depicted as solid lines and may be any combination of optical, electrical, and/or wireless connections. For example, links coupling nodes 0-13 may be high speed optical network connections configured to transfer data via wavelength, frequency, and or time division multiplexing. The nodes 0-13 are configured to transfer data flows and provide protection paths for the data flows. Traffic may be quickly rerouted to the protection paths in case of equipment failure to prevent interruption of the data flows.

Operations associated with the transfer of data may be considered to occur in a data plane. Operations associated with path setup, path redirection upon failure, and any other traffic engineering functions may be considered to occur in a control plane. Nodes 0-13 may natively operate in both the control plane and the data plane. For example, nodes 0-13 may be configured to setup paths via MPLS, Generalized MPLS (GMPLS), etc. Each flow, path, and/or backup may be assigned one or more labels. Packets entering the network topology 100 from a source, for example from an access network, are encapsulated with a header comprising corresponding labels. The packets are then switched along paths according to their labels. Upon exiting network topology 100 at a destination, such as another geographically distant access network, the packets are decapsulated to remove the header and associated labels and then forwarded toward the final destination.

Figure 2:
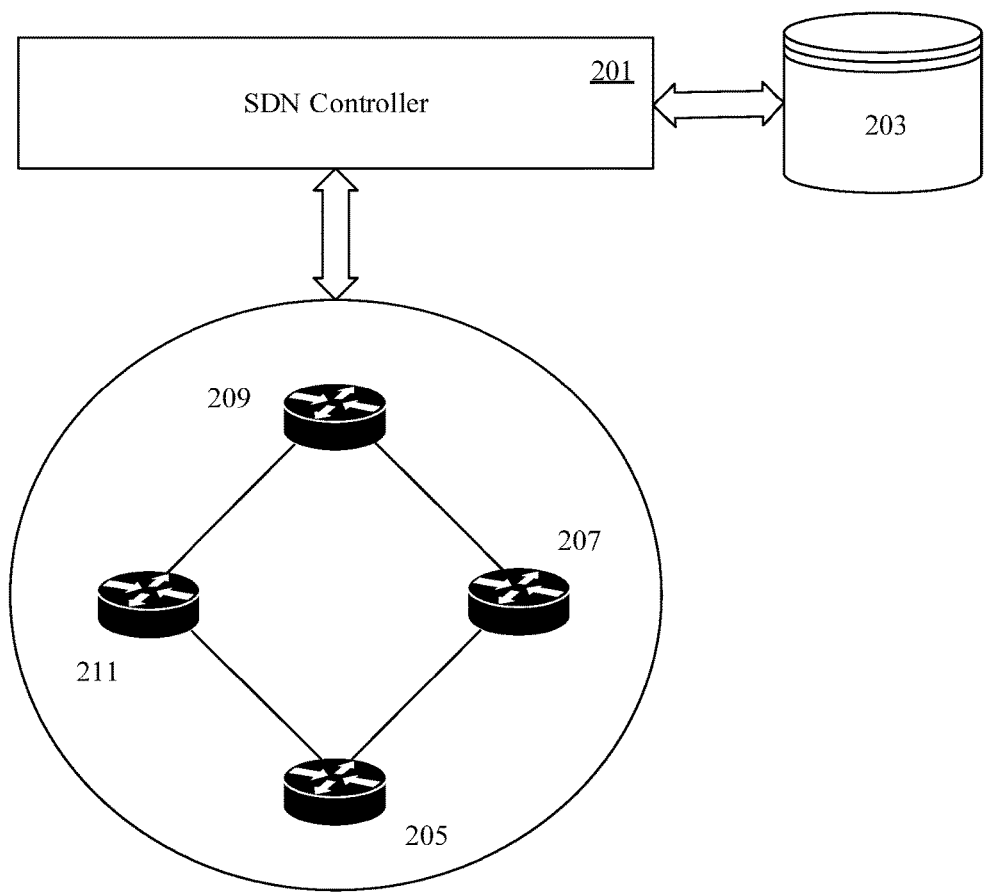
FIG. 2 depicts a block diagram of an exemplary network configuration, in accordance with various embodiments of the present disclosure.

An SDN network may employ a different paradigm from an IP network. An SDN network isolates the control plane from the data plane. An SDN controller, such as SDN controller 201 discussed with respect to FIG. 2, is configured to provide and manage control plane functions, while an SDN switch is configured to forward data across the data plane by employing flow tables. The SDN nodes communicate with the SDN controllers, for example by employing an OF protocol, to obtain flow table updates. When a new flow is detected, the SDN-OF nodes request flow information from the SDN-OF controller and the controller will push updated flow tables to every affected switch accordingly. As SDN-OF nodes switch traffic by employing flow tables and IP nodes may switch traffic based on labels, IP nodes may not be natively compatible with SDN-OF nodes.

To create a hybrid network, a logically centralized SDN-OF controller is installed and attached to existing network nodes. Some IP nodes may be reprogrammed with instructions from the controller to act as SDN-OF nodes. Replacing/reprogramming IP nodes may be expensive in terms of new equipment and labor costs. Node replacement may also be disruptive to operations. As such, a mechanism is disclosed to enable the controller to minimize the number of IP nodes to be converted to SDN-OF nodes while maintaining network wide SDN path failure protection and SDN load balancing as discussed further below.

For illustrative purposes, the network topology 100 is depicted after conversion to a hybrid network with partially integrated SDN-switches. In the example shown, nodes 3 and 7 are depicted in solid black to denote nodes 3 and 7 have been converted from IP nodes into SDN switches with SDN-OF functionality. The remaining nodes 0-2, 4-6, and 8-13 remain IP based switches.

FIG. 2 depicts a block diagram 200 of an exemplary network configuration, in accordance with various embodiments of the present disclosure. As presented in FIG. 2, an SDN-OF controller 201 executes and controls one or more network nodes (205, 207, 209, and 211) in a hybrid IP and SDN-OF network. More importantly, in one or more embodiments, the Controller will determine a minimum set of nodes that need to be SDN-OF enabled not only in the planning phase, but also dynamically to adapt to changes in network state changes or fluctuation in network traffic. Network nodes 205, 207, 209, and 211 may be substantially similar to nodes 0-13 in network topology 100. According to one or more embodiments, the SDN controller 201 is a SDN based control node that operates in the control plane. The SDN controller 201 may collect network status and/or traffic data in the network from nodes 205, 207, 209, and 211 and/or any other network nodes constantly or periodically. The SDN controller 201 employs the collected data to calculate routing or flow tables (as defined in the OF protocol), which are distributed to the SDN enabled devices using the OpenFlow protocol. In one or more embodiments, the SDN controller 201 also performs load balancing by dynamically selecting the intermediate nodes through which forwarding of redirected packets is performed based on current network status and/or traffic.

In one or more embodiments, one or more of the nodes (205-211) may be IP nodes that has been converted to implement SDN-OF functionality (e.g., as SDN-OF switches/routers such as nodes 3 and 7). The SDN-OF enabled devices may perform packet forwarding, while abstracting routing decisions to the SDN-OF controller 201. Routing decisions may be based on network status and/or traffic data accumulated in the nodes (205-211) and received in the SDN-OF controller 201, or based on routing policies.

In one embodiment, the network state, network topology, and the traffic data may be stored in a database 203, such as a traffic engineering database, coupled to the SDN-OF controller 201, and used by the SDN controller 201 to generate flow tables, similar to the routing tables in the IP routers or switches, but with more fine grained control based on all multi-layer attributes that could be derived from the packets or through other means. The generation of the flow/routing tables by the SDN controller 201 may be performed dynamically, based on new packets received at a network node 205, 207, 209, or 211 such that the packets require routing decisions from the SDN controller 201. The SDN controller 201 may also perform flow/routing generation at pre-determined or periodic intervals based on certain routing policies. Once generated, the SDN-OF controller 201 distributes the flow/routing tables to the SDN-OF enabled devices at network nodes 205, 207, 209, and/or 211. When a link failure is experienced by an IP node or an SDN-OF node, affected packets are forwarded via IP tunneling protocols to some SDN-OF enabled devices, which then forward the packets along alternate routes based on the flow/routing tables received from the SDN-OF controller 201.

Figure 3:
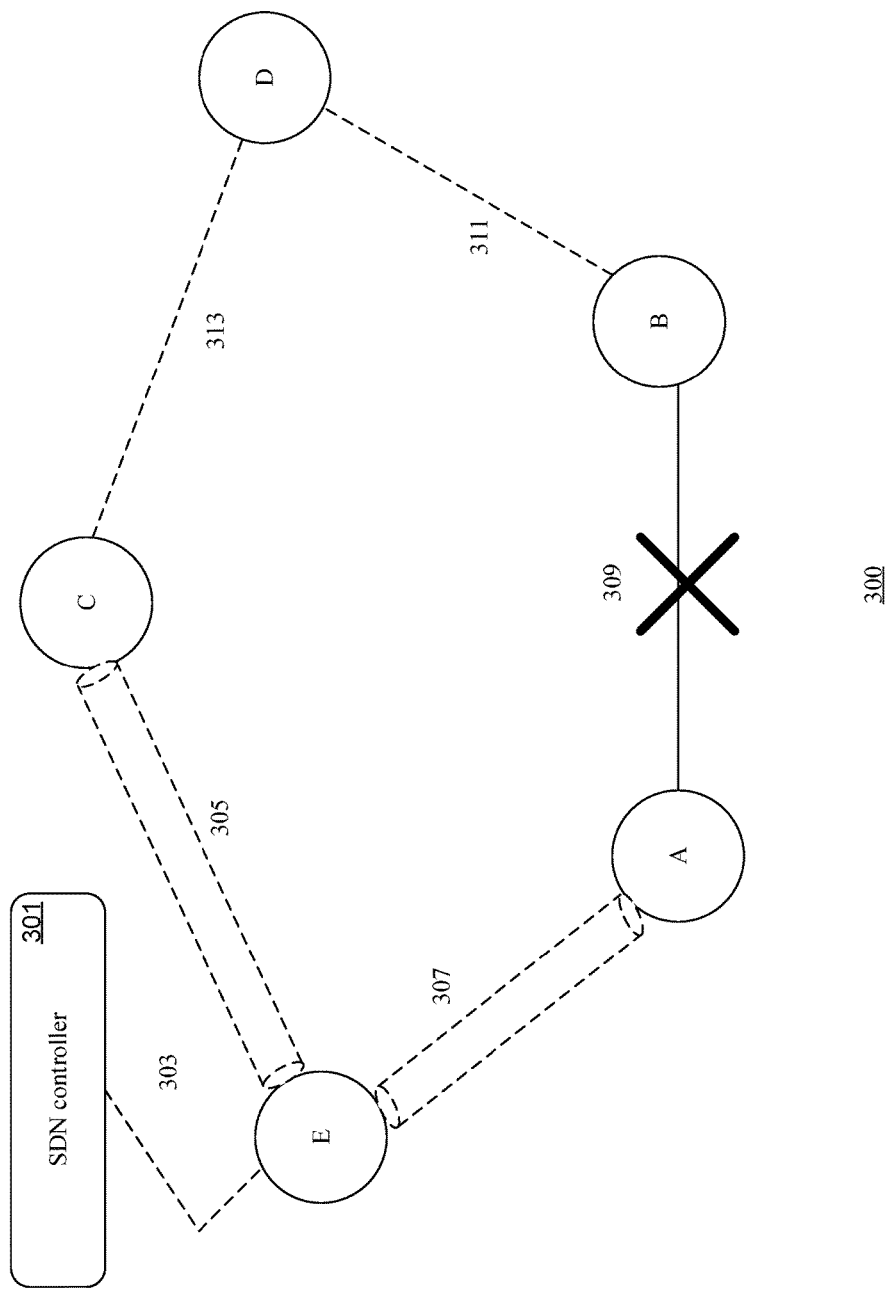
FIG. 3 depicts a block diagram of an exemplary scenario, in accordance with various embodiments of the present disclosure.

FIG. 3 depicts an illustration of a proposed framework 300 according to one or more embodiments of the claimed subject matter. Framework 300 comprises an SDN controller 301, nodes A, B, C, D, and E, which are connected by links 305, 307, 309, 311, and 313 as shown. SDN controller 301 may be substantially similar to SDN controller 201, nodes, A B, C, D, and E may be substantially similar to nodes 0-13, 205, 207, 209, and/or 211, and links 305, 307, 309, 311, and 313 may be substantially similar to the links of topology 100 and/or diagram 200, respectively. SDN controller 301 may communicate with an SDN-OF switch positioned in node E via link 303, which may be similar to links 305, 307, 309, 311, and 313, but may carry control data (e.g. OF protocol packets) and not transmission data (e.g. data plane transmission).

After the SDN-OF controller enables a minimum set of nodes with SDN-OF forwarding capabilities, each interface of every IP node in a network (e.g., nodes A, B, C, and D) is configured to establish a backup IP tunnel to an SDN node (e.g. node E) to provide failover upon detecting a link failure. The IP tunnel is established between the detecting IP node and one or more SDN-OF switch(es) which is/are called the designated SDN switch(es) for that IP device (router or switch). Each IP node may determine which SDN node is a designated SDN switch/node based on control data received from a management node such as an SND controller. FIG. 3 depicts an exemplary scenario where a link failure is detected. For example, detecting node A establishes an IP tunnel to node E, which contains an SDN-OF switch, via link 307. As presented in FIG. 3, when a link failure is detected (e.g., between nodes A and B), node A—which is directly connected to the failed link—immediately forwards all the packets that would have transmitted on the failed link to the corresponding designated SDN-OF switch in node E through the pre-configured and established IP tunnel via link 307.

Upon receiving the tunneled traffic from node A, the SDN-OF switch of node E first inspects the packets, performs a table lookup to determine an alternate route for the packets to reach their intended destination(s) that bypasses the failed link and that also will not cause the packets to be rerouted back to the failed link. Once determined, the SDN-OF switch forwards the data packet to the destination node if possible, or an intermediate node along the calculated alternate route (in this case, intermediate node C) in an IP tunnel via link 305 connected with the intermediate node (C). In one or more embodiments, the route to the identified intermediate node may be referenced in the table look up, with the route being calculated at an external network controller using routing optimization algorithms, such as the shortest path algorithm. At the intermediate node C, the packets are forwarded to the destination node, again through an IP tunnel that is unaffected by the failed link.

In one or more embodiments, the assignment of designated SDN network devices is determined by a node selection algorithm that is executed by the controller, as discussed below, in a manner that is destination independent, and as such the complexity of configuring a failover is minimized since routers in the network are not required to account for each individual destination. In one or more embodiments, a designated SDN switch accommodates all the possible destinations tunneled from an affected node with corresponding designated SDN-OF enabled nodes. The particular route traveled may be calculated by the SDN controller 301, and distributed to each of the SDN network devices, based on the network states and the observed or predicted traffic load.

Figure 4:
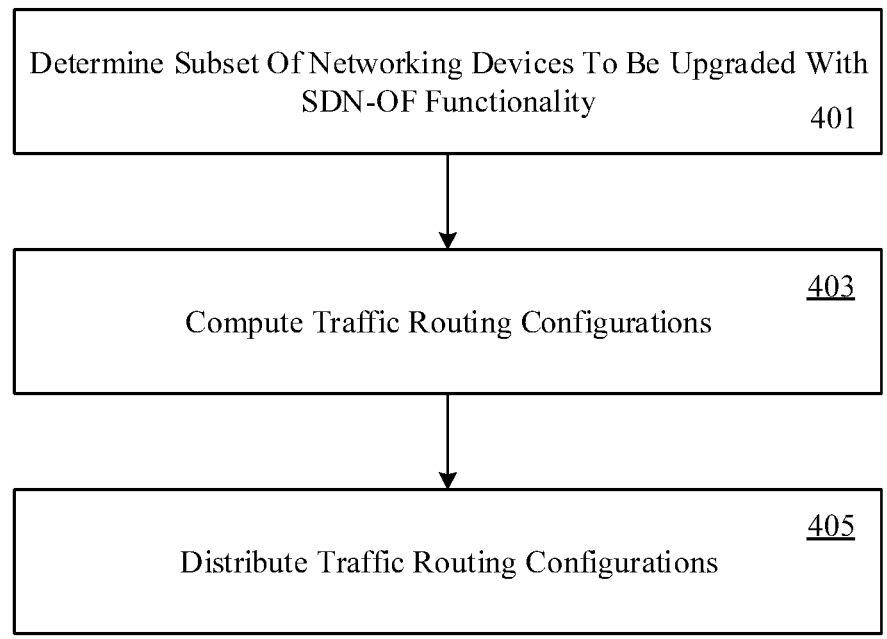
FIG. 4 depicts a flowchart of a process for partially integrating SDN-OF enabled devices in an IP network, in accordance with various embodiments of the present disclosure.

FIG. 4 depicts a flowchart of a process 400 for partially integrating SDN-OF enabled devices, such as nodes 3, 7, 205, 207, 209, 211, and/or E into an IP network such as network topology 100, diagram 200, and/or framework 300, in accordance with various embodiments of the present disclosure. Process 400 may be initiated, for example, upon determination that a network should be upgraded to be at least partially SDN compliant. For example, after the SDN controller, such as SDN controller 201 and/or 301, or other network management device decides which IP nodes should be upgraded to SDN-OF switches, the controller could send a recommendation to a network administrator to upgrade or transform the selected devices to be SDN-OF enabled and then provide route protection as discussed with respect to framework 300. Or as network states changes or traffic flow fluctuates, the controller could also dynamically re-calculate the selection and enablement of a new set of SDN-OF enabled devices. At step 401, a subset of nodes in an IP network is determined by the controller to be upgraded with SDN-OF functionality. For example, nodes 3 and 7 are selected as a subset of IP nodes 0-13 in network topology 100. An SDN controller and/or other management node may determine which IP nodes to upgrade to SDN nodes by requesting and receiving network status information from the IP nodes. Therefore, the subset of nodes may be selected by the controller to be replaced or programmatically upgraded with SDN-OF capabilities. In one or more embodiments, the number of nodes selected to be replaced or programmatically upgraded is minimized, to likewise minimize the cost of deployment and interruptions to service that may result from integrating SDN capabilities. The subset of IP network nodes may be selected by determining the least number of nodes that still allows the network to achieve certain characteristics. In one embodiment, the subset of IP network nodes is selected such that 1) for each link that includes a node that is not enabled with SDN-OF functionality, a SDN-OF enabled device in the network is determined and designated; and 2) for every SDN-OF enabled networking device, at least one intermediate node that is not enabled with SDN-OF functionality is selected for each possible destination node in the network.

The nodes selected at step 401 maybe replaced by dedicated SDN hardware such as switches, or alternately may be upgraded programmatically via the installation of SDN capable software modules. A software module (e.g. a computer program product) may be any unit of instructions that can be stored in a non-transitory memory, accessed, and executed by a processor to cause the processor and/or associated components to perform an associated function, for example a library, an executable file, a self-installable binary code, software, firmware, etc. In one or more embodiments, an SDN-OF capable network controller, such as SDN controller 201 and/or 301, is executed in a node external with respect to, but communicatively coupled with, the SDN-OF enabled devices. The SDN-OF capable network controller may be executed on a server or another computing device for example. Once executing, the SDN controller receives traffic data from both the un-upgraded IP nodes and the upgraded IP nodes comprising SDN-OF capabilities in the network, via one or more communications protocols. The traffic data is then used to compute traffic routing configurations (e.g., routing/flow tables) for the SDN-OF enabled devices at step 403. Finally, at step 405, the traffic configurations are distributed to the SDN-OF enabled devices. In one or more embodiments, the acquisition of traffic data and the generation of traffic configurations may be performed periodically and even dynamically, in order to ensure current traffic data and/or network status is reflected in the traffic configurations.

Various technologies may be employed to allow the SDN controller to communicate with both the IP nodes and the SDN enabled nodes. For example, the SDN controller may employ OF adaptors, associated translation protocols, and/or any other device, mechanism, system, method, protocol, program, or other item disclosed in U.S. patent application Ser. No. 14/071,329 filed Nov. 4, 2013 by Min Luo, et. al, and entitled "Transformation and Unified Control of Hybrid Networks Composed of Openflow Switches and Other Programmable Switches," which is incorporated by reference. In an embodiment, an OF Adapter-based network control architecture allows an OF Controller to control a hybrid SDN-IP network, independently of the specifics of the underlying NEs (Network Elements). For example, an NE may be any type of forwarding or routing device with a programmable API. The NEs may be classified into OpenFlow—enabled Network Elements (OF NE) and Non-OpenFlow-enabled Network Elements (NOF NE). The OF Controller may control the hybrid SDN-IP network through the functionality of an OF Adapter. The OF Adapter is an entity configured to perform translation between control messages and/or rules specified by a protocol (e.g., OpenFlow) and control messages/protocols that a NOF NE may support and/or understand. For example, an OF Adapter may translate OpenFlow messages received from an OF controller into messages that NOF NEs support, and then disseminates such messages to target NOF NEs. As another example, an OF Adapter may also translate messages received from NOF NEs into OpenFlow messages, and then deliver such OpenFlow messages to the OF controller. An OF adapter may be logically centralized and may be deployed in a centralized and/or a distributed fashion. For example, one or more OF Adapters may be located in one or more servers as an OF plug-in to NOF NEs, which may cause the associated NOF NEs to behave like OF NEs. Further, it should be noted that IP nodes may be upgraded by employing multiple mechanisms. For example, an SDN controller such as SDN controller 201 and/or 301 and/or any other management node, server, etc. may transmit the SDN capable software module(s) to the IP node or other sever to be upgraded to an SDN-OF router, switch, or SDN controller. As another example, the SDN controller/management node/server may transmit a message and/or display a result to a network administrator or other technician to request that the network administrator/technician cause the IP node/server hardware to be replaced with hardware comprising an SDN-OF switch/router and/or SDN controller.

Node Selection

According to one or more embodiments, the number of SDN-OF enabled devices may be limited to the minimum number that still provides complete failure recovery coverage for every node in the network. Determining the minimum number of SDN-OF enabled devices by the Controller includes determining a network configuration such that: 1) for each link failure; an affected node has at least one designated SDN enabled device which is destination independent, and 2) for every SDN-OF enabled device, there exists at least one intermediate node for each possible destination. Such node selection is performed by a SDN controller, such as SDN controller 201 and/or 301, by a management node, and/or by any other server. Node selection may be as discussed herein may be performed as part of step 401 of process 400. Further, node selection for upgrade may be performed upon startup of an SDN controller/management node, upon startup/restart/re-optimization of a portion of a network (e.g. as part of a green field and/or brown field network optimization of a network sub-portion), dynamically upon occurrence of a pre-determined network state change, such as traffic load change, and/or upon receiving network administrator input.

Minimizing the number of nodes in a network that can be replaced or upgraded with SDN enabled functionality during node selection may be expressed as:

$$\text{minimize} \sum_i u_i \quad (1)$$

$$\text{subject to: } \sum_i [\![b^e_{x,i}(1-\delta^e_{x,i})]\!]\left[\sum_m [\![(1-\delta^e_{i,m})(1-\delta^e_{m,d})]\!]\right] \geq \beta^e_x \delta^e_{x,d} \quad (2)$$

$$\sum_i b^e_{x,i} \leq \beta^e_x \quad (3)$$

$$b^e_{x,i} \leq u_i \quad (4)$$

where (1) The objective is to minimize the number i of SDN-OF enabled switches u, with the following constraints;

(2) for each link e, when originating node x fails, x must have at least one designated SDN-OF enabled switch to contact;

(3) if node x is directly coupled to link e, node x must have one designated SDN-OF enabled switch to contact when link e fails; and (4) node i must be upgraded to a SDN-OF enabled switch if node i is chosen by any node as the designated SDN-OF enabled switch.

Table I summarizes the parameters and notations:

TABLE I

NOTATIONS FOR REACHABILITY

| | |
|---|---|
| (V, E) | A network with node set V and link set E |
| $\beta^e_x$ | Binary, $\beta^e_x = 1$ if node x is an end node of link e; 0, otherwise. |
| $\delta^e_{i,j}$ | Binary, $\delta^e_{i,j} = 1$ if link e is on the shortest path from node i to node j; 0 otherwise. |
| $b^e_{x,i}$ | Binary, $b^e_{x,i} = 1$ if node i is chosen as node x's designated SDN switch when link e fails; 0, otherwise. |
| $N_{i,m}$ | Binary, $N_{i,m} = 1$ if node i and node m are neighbors with only one hop; 0, otherwise |
| $u_i$ | Binary, $u_i = 1$ if node i is chosen to be a SDN switch; 0, otherwise. $e \in E$ and $i, j, x, m \in V$ |

Network Recovery

Figure 5:
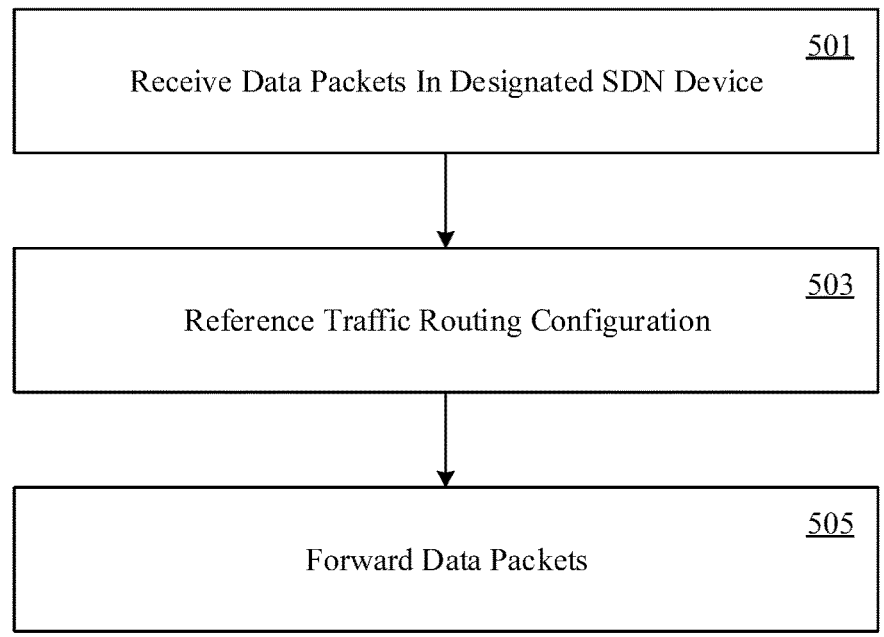
FIG. 5 depicts a flowchart of a process for performing failure recovery in a hybrid network, in accordance with various embodiments of the present disclosure.

FIG. 5 depicts an exemplary flowchart of a process 500 for network recovery after a failure, for example by a network such as network topology 100, diagram 200, and/or framework 300. Process 500 may be initiated, for example, by a SDN-OF enable node, such as nodes 3, 7, 205, 207, 209, 211, and/or E of topology 100, diagram 200, and/or framework 300, respectively. Process 500 may be initiated upon a link failure such as the link failure depicted with respect to link 309 of FIG. 3. According to one or more embodiments, a failure in an adjoining link or adjoining node is detected in a first detecting node directly connected to the failed network entity. The detecting node may be any IP node discussed herein, for example node A adjacent to failed link 309. Upon detecting an adjacent link failure or an adjacent node failure, the detecting node redirects all the traffic on the failed link to its designated SDN-OF device(s) through IP tunneling, for example to node E via link 307. In one or more embodiments, the packets are delivered via an established IP tunnel between a designated SDN-OF device the detecting node. At step 501, the redirected data packets from the detecting node adjoining the failed link or failed node is received in a designated SDN device such as IP nodes upgraded with SDN-OF functionality (e.g. node E). Upon receiving the tunneled traffic from the affected/detecting node, the SDN-OF switch first inspects the packets, then references a traffic routing configuration of pre-determined traffic data (e.g., via a table lookup procedure) at step 503 to determine an alternate route for the packets to reach their intended destination(s) that bypasses the failed link or node. At step 505, the data packets are then forwarded on to the destination if the destination is directly connected to the SDN-OF enabled device. If the destination is not directly connected to the SDN-OF enabled device, the data packets are forwarded to a next node in an alternate route, for example to node C via a tunnel over link 305. The next node then forwards the packets on to the destination node if possible, or to the next node in the route that allows the packets to reach the destination without looping back to the failed link or node.

Flow/routing tables may be supplied to the SDN-OF enabled device (e.g. nodes 3, 7, 205, 207, 209, 211, and/or E) by a communicatively coupled network SDN-OF controller, such as controller 201 and/or 301. Since each node has prior knowledge of which SDN-OF switch(es) the traffic on the failed link should migrate to, the recovery can be completed very quickly. The SDN-OF controller can also collect the link utilization of the hybrid network and predetermine the routing paths for the traffic on the failed link to achieve better load balancing in the traffic, avoiding potential congestion caused by traffic redistribution. By setting up tunnels between the IP routers and SDN-OF switches, the proposed framework allows IP routers to perform failover immediately upon detecting a link/node failure and redirect traffic to SDN-OF switches. The SDN-OF switches can then forward the traffic to bypass the failed link based on the routing decision made by the SDN-OF controller. Since the SDN-OF controller is configured to receive a control data providing a global perspective of the entire network to gain the knowledge of the current network state, including the node traffic loads and/or status of the network, optimal routing decisions can be made to load-balance the post-recovery network.

In one or more embodiments, IP tunneling may include IP tunneling protocols that allow routing protocols through the created tunnels, such as Generic Routing Encapsulation (GRE). To provide failover, routing protocols such as Enhanced Interior Gateway Routing Protocol (EIGRP) MPLS, GMPLS, etc. may be used to keep a backup route in case a primary route fails. Other routing protocols such as Open Shortest Path First (OSPF) may be utilized in conjunction with the IP tunneling protocols to perform policy-based routing to select a primary route and/or a backup route prior to or upon occurrence of a link failure. Alternate embodiments may also use methods such as configuring static routes by employing generalized prefix addresses so that the router employs a less specific path when a link on the primary path fails.

While the foregoing description has focused on single link failures, it is to be understood that embodiments of the present disclosure are well suited to be extended to failures at nodes as well, according to various embodiments. For single node failures, the tunneling paths determined in table look up or traffic data reference would not include the failed node.

Load Balancing

After all designated SDN-OF devices are determined according to the process 400 described above, a designated SDN-OF enabled node, such as nodes 3, 7, 205, 207, 209, 211, and/or E, is identified for each un-upgraded IP node, such as nodes 0-2, 4-6, 8-13, 205, 207, 209, 211, A, B, C, and/or D. The designated SDN-OF enabled node may be selected by an SDN controller such as SDN controller 201 and/or 301, a management node, and/or any other server. Such SDN-OF enabled node is designated so that the corresponding un-upgraded IP node forwards data packets to the designated SDN-OF enabled node when a failure in an adjoining link or node occurs. The designated SDN-OF enabled node may then forward the data packets directly toward a destination or a predetermined intermediate node. The intermediate node may be an SDN-OF enabled node or an un-upgraded IP node. For a certain destination, there may exist multiple feasible intermediate nodes, and selecting an optimal intermediate node may help further avoid or reduce congestion. In one or more embodiments, the network (SDN-OF) controller may compute the selection of such intermediate nodes periodically to react to current network conditions.

In one or more embodiments, the selection of designated SDN-OF enabled nodes is destination dependent, so that a corresponding intermediate node is selected for every destination node. Intermediate node selection is performed by minimizing the maximum link utilization over all links after a redistribution of traffic following a network entity (link or node) failure. In one or more embodiments, the network/SDN controller determines the load of each link. To acquire this information, the SDN-OF controller and each IP node in the network may run one or more traffic engineering protocols (such as Simple Network Management Protocol (SNMP), OpenFlow, OSPF, intermediate system to intermediate system (IS-IS), etc.) which allows the SDN-OF controller to gather and/or passively receive link load information in the network. Under such protocols, information such as available bandwidth can be exchanged, so that the SDN-OF controller can receive link utilization information directly from the IP nodes and/or via the SDN-OF switches as discussed further in U.S. patent application Ser. No. 14/071,329. This allows the SDN-OF controller to obtain control plane information for the entire network and select proper intermediate nodes to achieve load balancing based on current traffic and/or network status. In still further embodiments, the hybrid network is configured to consider prioritization. According to these embodiments, data packets flagged or otherwise identifiable as high priority may be routed along routes with greater available bandwidth.

By considering every single link (or node) failure scenario, the SDN controller chooses the intermediate node for each destination node so that the link utilization is minimized after redirecting all the affected packets. Selected intermediate nodes may, in some embodiments, be stored as a rule and installed in a table, such as a flow table of SDN-OF enabled devices and/or a routing table in a corresponding IP node.

In one embodiment, the SDN-OF controller performs the optimization process for intermediate node selection periodically to balance the expected bandwidth utilization along each link after redirection caused by a link failure. Paths are computed by the SDN-OF controller, which can further obtain the link-path incidence indicating if a link is used by a certain path. The load-balancing formulation may be expressed as below, and can be applied for every single failure situation:

$$\text{minimize } y \tag{5}$$

$$\text{subject to:} \tag{6}$$

$$\sum_p \alpha_{d,p}^s = 1$$

$$\sum_s \square \sum_d \square \sum_p \lambda_{e,d,p}^s \alpha_{d,p}^s r_d^s + l_e = y_e \tag{7}$$

$$y_e \leq \Upsilon_{c_e} \tag{8}$$

where
(5) The objective is to minimize the maximal link utilization, with the following constraints;
(6) ensures that for each affected router and destination pair, only one path is used to reach each destination;
(7) the bandwidth utilization on each link after traffic redirection is the summation of current bandwidth utilization of each link and the bandwidth utilization from the designated SDN-OF switches to the destinations; and
(8) the bandwidth utilization of each link after traffic redirection is bounded by the maximal link utilization.
The parameters are described as in the following table:

TABLE II

| NOTATIONS FOR LOAD BALANCING | |
|---|---|
| $l_e$ | Traffic load on link e without redirected traffic |
| $c_e$ | Capacity of link e |

TABLE II-continued

NOTATIONS FOR LOAD BALANCING

| | |
|---|---|
| $\lambda_{e,d,p}{}^s$ | Binary, $\lambda_{e,d,p}{}^e = 1$ if link e is on the path p from an affected router s to destination d; 0, otherwise |
| $t_d{}^s$ | Traffic volume from an affected router s to destination d |
| $\alpha_{d,p}{}^s$ | Binary, $\alpha_{d,p}{}^s = 1$ if path p is chosen for the affected router s and destination d to deliver traffic to destination d; 0, otherwise |
| $y_e$ | Traffic load on link e after redirection |
| $\gamma$ | Upper bound of link utilization |

Equation (5) ensures that for each source to destination pair, only one route is used, and by extension only one intermediate node is employed to protect the path between the source and destination node. Equation (6) ensures that the workload on each link after a traffic redirection is the summation of the current bandwidth utilization of each link and the traffic volume from the designated SDN-OF device to the destination nodes. Equation (7) ensures that the bandwidth utilization of each link after a traffic redirection is bounded by the maximal link utilization. By solving the above equations to minimize link utilization, the upper bound of link utilization can be calculated when any single link failure occurs. In addition, the intermediate node that should be used by any IP node to reach a certain destination in the event of a link failure is also determined.

Multiple Designated SDN-OF Enabled Devices to Increase Reliability

While single designated SDN devices for IP nodes have been primarily described thus far herein, it is to be understood that embodiments of the claimed subject matter are not limited to such, and embodiments are well-suited to multiple designated SDN devices for one or more IP nodes in the network. Under circumstances where each router tunnels all affected traffic to one designated SDN device when a link failure is detected, the tunneling paths may be overwhelmed, and congestion in the links along the alternate route may occur. To alleviate this potential congestion, traffic traversing the tunnel paths after redirection may be reduced by introducing multiple designated SDN devices for each IP router so that affected traffic may be split among multiple channels. According to such embodiments, the approach can be further enhanced to allow 2 (or more) designated SDN switches for any IP device. It could be achieved by solving the following optimization problem:

$$\text{minimize} \sum_i u_i \quad (9)$$

$$\text{subject to: } b^e_{x,i}\beta^e_x\delta^e_{x,d} \leq (1 - \delta^e_{x,i})\left[\sum_m [\![N_{i,m}(1-]\!]\delta^e_{i,m})(1-\delta^e_{m,d})\right] \quad (10)$$

$$\sum_i b^e_{x,i} \leq N\beta^e_N \quad (11)$$

$$b^e_{x,i} \leq u_i \quad (12)$$

Where N stands for the number of designated SDN devices used by each router. This modified formulation is similar to the original formulation for determining single designated SDN devices save for the introduction of N to assure that each IP node can reach N designated SDN enabled devices when one of the links to the node fails. According to the formulations provided above, the minimum number of SDN enabled devices may be calculated, with $b_{x,i}{}^e$ indicating the N designated SDN devices used by each node.

When the N (>=2) designated SDN devices of each IP node (router) are determined, traffic may be further split among the multiple SDN devices. In one embodiment, a weighted hash is performed based on the link utilization of the tunneling paths to different designated SDN devices so that the redirected traffic forwarded to each designated SDN device is made proportional to the available bandwidth of those tunneling paths. In one embodiment, the SDN-OF periodically collects link utilization information of the entire network from the SDN-OF controller enabled or original IP devices, with each node computing the link utilization of the most congested link on the tunneling paths to different designated SDN devices. By subtracting this link utilization, the available bandwidth can be determined for each tunneling path. The available path bandwidth could then be used as the weight for each tunneling path, and traffic to different destinations is thereafter hashed to different designated SDN devices based on this determined weight.

Exemplary Computing Device

Figure 6:
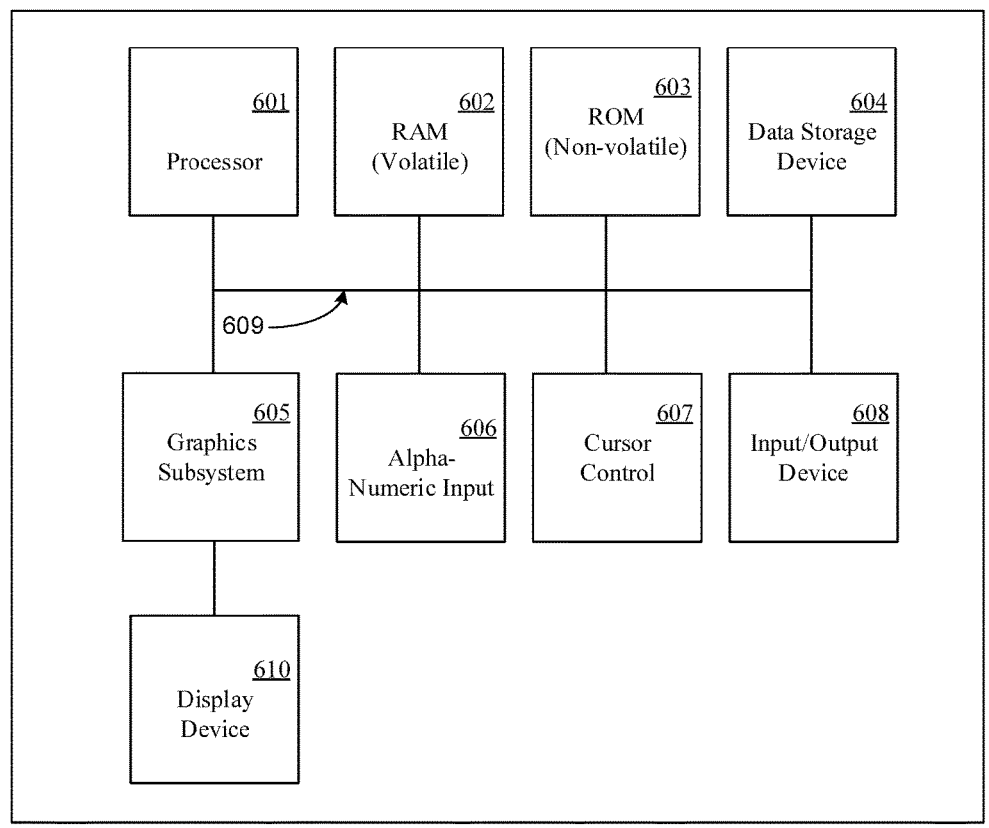
FIG. 6 depicts an exemplary computing device, in accordance with various embodiments of the present disclosure.

As presented in FIG. 6, an exemplary computer system 600 upon which embodiments of the present disclosure may be implemented includes a general purpose computing system environment. In one or more embodiments, one or more intermediate nodes, SDN-OF enabled nodes, destination nodes, un-upgraded IP nodes, and/or the computing environment upon which the network SDN-OF controller is executed may be implemented as a variation or configuration of exemplary computer system 600. For example, system 600 may be employed to implement IP nodes, 0-2, 4-6, 8-13, A-D, SDN enabled nodes 3, 7, and E, nodes, 205, 207, 209, 211, SDN controller 201 and 301, and/or database 203. System 600 may also be employed to execute process 400 and/or 500 as well as mechanism related to node selection, network recovery and/or load balancing. In its most basic configuration, computer system 600 includes at least one processing unit 601 and memory, and an address/data bus 609 (or other interface) for communicating information. Depending on the exact configuration and type of computing system environment, memory may be volatile (such as Random Access Memory (RAM) 602), non-volatile (such as Read Only Memory (ROM) 603, flash memory, etc.) or some combination of the two.

Computer system 600 may also comprise an optional graphics subsystem 605 for presenting information to the computer user, e.g., by displaying information on an attached display device 610, connected by a video cable 611. According to embodiments of the present claimed disclosure, the graphics subsystem 605 may be coupled directly to the display device 610 through the video cable. In alternate embodiments, display device 610 may be integrated into the computing system (e.g., a laptop or netbook display panel) and will not require a video cable 611.

Additionally, computer system 600 may also have additional features/functionality. For example, computer system 600 may also include additional storage (removable and/or non-removable) including, but not limited to, magnetic or optical disks or tape. Such additional storage is illustrated in FIG. 6 by data storage device 604. Computer storage media includes volatile and nonvolatile, removable and non-removable media implemented in any method or technology for storage of information such as computer readable instructions, data structures, program modules or other data. RAM 602, ROM 603, and data storage device 604 are all examples of computer storage media. For example, the computer system 600 may comprise a non-transitory medium coupled to a processor and comprising a computer program product, the computer program product comprising instructions that when executed by a processor cause the processor to perform any of the methods, method steps, processes, procedures, and/or control of apparatus components as discussed herein.

Computer system 600 also comprises an optional alphanumeric input device 607, an optional cursor control or directing device 607, and one or more signal communication interfaces (input/output devices 608, e.g., a network interface card). Optional alphanumeric input device 606 can communicate information and command selections to central processor 601. Optional cursor control or directing device 607 is coupled to bus 609 for communicating user input information and command selections to central processor 601. Input/output device 608 may comprise a communications interface for communicating with other nodes in a network, may also be coupled to bus 609, and can be a serial port, Ethernet port, fiber port, receiver, transmitter, and/or any other electrical and/or optical port(s) needed to communicate with SDN nodes and/or IP nodes as discussed herein. In some embodiments, input/output device 608 may also include wireless communication mechanisms. Using Input/output device 608, computer system 600 can be communicatively coupled to other computer systems over a communication network such as the Internet or an intranet (e.g., a local area network), or can receive data (e.g., a digital television signal).

With the solutions herein described, the traffic rerouting configuration in the SDN-OF switches could be performed periodically based on the updated network-wide status and/or the traffic load, while optimizing post-recovery load balancing. The computation results are then utilized by the SDN-OF controller to generate flow entries for the SDN-OF switches. Optionally, it is possible to enable prioritized traffic processing. For example, the approach could provide bandwidth guarantees for high priority traffic while only granting best-effort bandwidth allocation to other types of lower-priority traffic.

Embodiments of the claimed subject matter allow carriers or enterprises to quickly take advantage of SDN-OF capabilities to transform their existing data networks with low capital and operational expenditures, and offers significant improvement in network resource utilization, automated network management (for example, fast failure recovery with balanced traffic distribution), with significantly reduced management complexity and costs. Such new capabilities can be achieved without the need to overhaul their entire current IP (or MPLS) networks.

What is claimed is:

1. A controller node comprising:
a receiver configured to receive network state information including an internet protocol (IP) network topology of a network comprising a plurality of IP nodes and the controller and a bandwidth utilization for each link in the IP network topology;
a processor coupled to the receiver and configured to:
obtain the network state information including the IP network topology;
determine a subset of the IP nodes in an IP network topology to be upgraded to Software Defined Network (SDN) nodes to form a hybrid IP/SDN network configuration that provides network wide SDN path failure protection such that the hybrid IP/SDN network provides network wide SDN path failure protection; and
dynamically designate an SDN node for each un-upgraded IP node based on an expected bandwidth utilization after a network entity failure based reroute; and
an output interface coupled to the processor and configured to output the hybrid IP/SDN network configuration.

2. The controller node of claim 1, wherein the output interface comprises a transmitter, and wherein outputting the hybrid IP/SDN network configuration comprises transmitting an SDN capable software module to at least one IP node in the subset of the IP nodes to upgrade the at least one IP node to an SDN node.

3. The controller node of claim 1, wherein the output interface is configured to display the hybrid IP/SDN network configuration to indicate to a system administrator the subset of the IP nodes to be upgraded to the SDN nodes.

4. The controller node of claim 1, wherein the processor determines the subset of the IP nodes to be upgraded to the SDN nodes such that for a network entity failure, each IP node coupled to a failed network entity is configured to route data packets to a designated SDN node without traversing the failed network entity.

5. The controller node of claim 4, wherein there exists at least one intermediate node reachable for the designated SDN node for each possible destination without traversing the failed network entity.

6. The controller node of claim 1, wherein the processor determines the subset of the IP nodes to be upgraded to the SDN nodes based on a network state change or based on traffic fluctuations.

7. The controller node of claim 1, wherein the subset of the IP nodes to be upgraded to the SDN nodes is determined such that for a network entity failure, each IP node coupled to a failed network entity is configured to route data packets to N designated SDN nodes without traversing the failed network entity, where N is a value greater than one.

8. The controller node of claim 1, wherein the output interface is further configured to output control data to an un-upgraded IP node to indicate a corresponding designated SDN node for routing data packets upon network entity failure.

9. The controller node of claim 8, wherein the output interface is further configured to output control data to the designated SDN node indicating an intermediate node for each destination to support IP tunnel based rerouting between the un-upgraded IP node and the intermediate node via the designated SDN node.

10. A method comprising:
determining, by a processor of an Software Defined Network (SDN) controller, a subset of Internet Protocol (IP) nodes in an Internet Protocol (IP) network topology to be upgraded to Software Defined Network (SDN) nodes to create a hybrid IP/SDN network such that the hybrid IP/SDN network provides network wide SDN path failure protection;
determining, by the processor of the SDN controller, a designated SDN node for each un-upgraded IP node in the hybrid SDN/IP network, the designated SDN node being reachable by the un-upgraded IP node via an IP tunnel upon a network entity failure; and
transmitting, by a transmitter in the SDN controller, control data to each un-upgraded IP node indicating a corresponding designated SDN node.

11. The method of claim 10, further comprising receiving, by a receiver in the SDN controller, network state information comprising bandwidth utilization for each link in the hybrid SDN/IP network, wherein each designated SDN node is determined based on expected bandwidth utilization after the network entity failure.

12. The method of claim 10, further comprising transmitting, by the transmitter, control data to the designated SDN node indicating a designated intermediate node for each potential destination to support IP tunnel based rerouting between each corresponding un-upgraded IP node and the potential destination via the designated SDN node.

13. The method of claim 10, wherein N designated SDN nodes are selected for each un-upgraded IP node to support link utilization weighted hash based rerouting to each of the designated SDN nodes by the corresponding un-upgraded IP node, and wherein N is a value greater than one.

14. The method of claim 10, wherein the subset of the IP nodes to be upgraded to the SDN nodes is determined such that for the network entity failure, each un-upgraded IP node coupled to a failed network entity is configured to route data packets to a corresponding designated SDN node without traversing the failed network entity.

15. A method for re-routing data due to link failure in a hybrid network, the method comprising:
receiving, in a designated Software Defined Network (SDN)-Openflow(SDN-OF) enabled networking device, a plurality of data packets to be routed through a failed networking entity, the plurality of data packets being received from a first networking device corresponding to the failed network entity via an established Internet Protocol (IP) tunnel between the designated SDN-OF enabled networking device and the first networking device, the designated SDN-OF enabled networking device being determined as one of a subset of a plurality of IP nodes in a network to be upgraded to a SDN node based on an IP network topology of the network;
receiving a traffic routing configuration indicating an intermediate networking device from an SDN controller;
referencing the traffic routing configuration in the designated SDN-OF enabled networking device to determine the intermediate networking device between the designated SDN-OF enabled networking device and a destination node based on an amount of congestion for each candidate intermediate networking device; and
forwarding the plurality of data packets from the designated SDN-OF enabled networking device toward the destination node via the intermediate networking device.

16. The method of claim 15, wherein the designated SDN-OF enabled networking device is one of a plurality of designated SDN-OF enabled networking devices for the first networking device, and wherein the plurality of data packets are routed to the designated SDN-OF enabled networking device based on a weighted hash performed by the first networking device on link utilization of the established IP tunnel.

17. The method of claim 15, wherein the designated SDN-OF enabled networking device is designated to protect an IP node associated with the failed network entity.

18. The method of claim 15, wherein the designated SDN-OF enabled networking device is designated dynamically by the SDN controller based on network traffic conditions.

* * * * *